United States Patent [19]

Murakami

[11] 3,941,223

[45] Mar. 2, 1976

[54] INCHING VALVE

[75] Inventor: Kiyoharu Murakami, Neyagawa, Japan

[73] Assignee: Kabushiki Kaisha Daikin Seisakusho, Osaka, Japan

[22] Filed: June 3, 1974

[21] Appl. No.: 476,077

[30] Foreign Application Priority Data
June 14, 1973 Japan.................................. 48-67580

[52] U.S. Cl............. 192/4 A; 192/13 R; 192/87.19; 192/109 F; 137/625.17
[51] Int. Cl.²......................................... F16D 67/04
[58] Field of Search....... 192/4 A, 4 C, 13 R, 87.18, 192/87.19, 109 F

[56] References Cited
UNITED STATES PATENTS

| | | | |
|---|---|---|---|
| 3,042,165 | 7/1962 | Yokel............................ | 192/109 F X |
| 3,613,844 | 10/1971 | Asano.................................. | 192/4 C |
| 3,752,281 | 8/1973 | Arnold............................. | 192/87.19 |
| 3,840,099 | 10/1974 | Higuchi............................... | 192/4 A |

*Primary Examiner*—Benjamin W. Wyche
*Attorney, Agent, or Firm*—Pierce, Scheffler & Parker

[57] ABSTRACT

An "inching" valve for use in vehicles such as an industrial lift truck for controlling the operation of separate pressurized fluid actuated clutches for driving the vehicle forwards or backwards wherein rotary and axial movements of a single cylindrical valve piston within its cylinder control respectively clutch selection for forward or reverse drive and the "inching" movement in the drive direction selected in functional relation with actuation of the brake pedal.

2 Claims, 5 Drawing Figures

INCHING VALVE

The present invention relates to an improvement in the construction of a so-called "inching" valve for use in vehicles such as, for example, industrial lift trucks in which forward and rearward oil clutches are installed. The valve in accordance with this invention is constructed to control and regulate fluid pressures as well as to switch or select fluid passageways which lead a source of pressurized fluid selectively to a forward clutch or to a rearward clutch, and the valve structure includes both axial and rotary, i.e. circumferential, movement of a valve piston for pressure regulation and inching.

In the prior art transmission control system for use in a vehicle in which forward and rearward clutches are installed, two valves, i.e. a selector valve for switching forward and rearward fluid passageways, and an inching valve for inching the vehicle forwardly, or rearwardly, as desired, to accomodate its positioning and the handling of material, are generally employed as shown, for example, in U.S. Pat. No. 2,786,368. In accordance with the system disclosed in that patent the selector valve is manually operated to select three positions. These are: a forward position which leads pressurized oil to the forward oil-operated clutch (at that time the rearward oil clutch is connected to a drain pipe); a rearward position which leads oil to the rearward oil-clutch (when the forward clutch is drained); and a neutral position in which pressurized oil is simply drained, leaving both clutches free and inoperative. On the other hand, the inching valve is cooperative with a brake pedal in the manner that the inching valve cuts off the oil supply to either of the clutches regardless of the position of the selector valve, in the first stage of the brake pedal stroke, namely before the brake starts to work effectively.

Therefore, during forward operation with the selector valve shifted to the forward position, when pressure is applied to the brake pedal, the forward oil-clutch is automatically released before the braking is effected, even if a forward-rearward select lever is left in the forward position. Following to the brake operation, when the pressure applied to the brake pedal is gradually decreased, the brake is released and after that, the clutch engages gradually providing a condition of sliding contact which enables the vehicle to inch. Inching operation is also possible, if desired, in the pushing-down stroke of the brake pedal.

In the above-mentioned prior art construction, two valves are inevitable. Therefore, its construction and piping are likely to become complicated, and much labor and skill are required in regulating and operating the device. To eliminate the above-mentioned disadvantages, a single valve system has been disclosed in, for example, Japanese Pat. Publication No. 47-46735. But in the single valve system, an axially slidable selector piston valve is compulsorily moved back to its neutral position each time the brake is applied. Therefore, its construction is more complicated and it requires large manual power to operate. Moreover, it is troublesome to regulate fluid pressure in relation to the stroke of the brake pedal in that a pair of pressure regulators are necessary at the axially opposite ends of the selector valve.

The present invention avoids the above-discussed disadvantages utilizing the fact that a cylinder and a piston slidable therein provide a cylindrical valve surface, and the valve surface suitably provides a combined circumferential rotary valve and an axially slidable valve for the above-mentioned selector and inching valve.

A principal object of the invention is to provide a single piston inching valve of a design favorable to a lower cost of manufacture.

Another object of the invention is to provide an inching valve which occupies a small space and can be operated with a small power.

Other objects will become apparent from the following description taken together with the accompanying drawings, in which.

Figure 1:
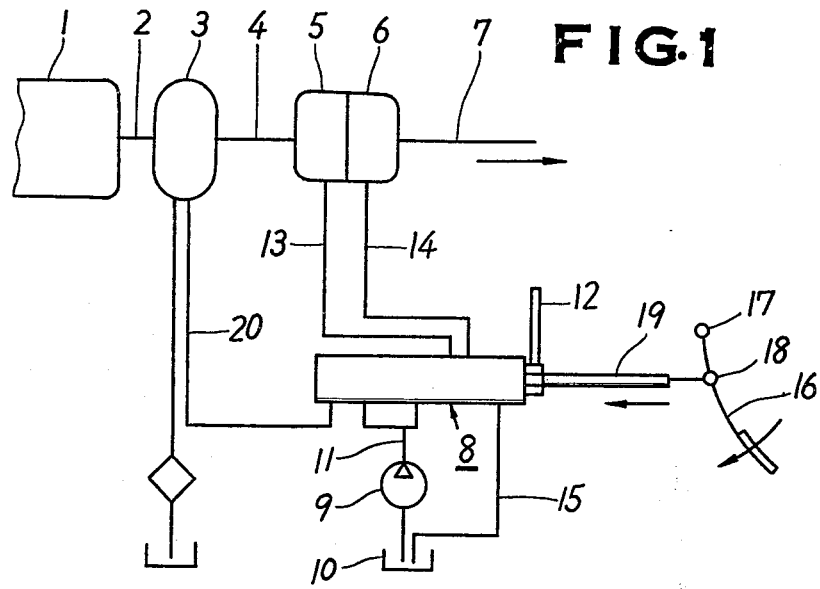
FIG. 1 is a diagrammatic showing of one embodiment of the improved inching valve structure as applied in an industrial lift truck, the details of the valve mechanism per se being illustrated in FIG. 2.

With reference now to FIG. 1, output shaft 2 of engine 1 is connected to a torque converter 3 and the torque converter output shaft 4 is connected to drive shaft 7 by way of a forward oil-clutch 5 and a rearward oil-clutch 6. These clutches are provided with multiple friction plates. The drive shaft 7 is connected to a rear axle, not shown, of the lift truck by way of a conventional differential mechanism. Numeral 8 indicates, in general, the novel inching valve structure in accordance with the invention for selecting either of the two clutches 5, 6 and regulating fluid pressure to inch the lift truck forward, or backward, as hereinafter explained in detail. Working fluid, oil, in sump tank 10 is compressed by pump 9 and introduced to a passageway inside valve 8 through pipe line 11, which passageway, in turn, is connected to forward clutch 5 by way of a pipe line 13; or to rearward clutch 6 by way of a pipe line 14; or to sump tank 10 by way of a drain pipe line 15. These selections are, in this example, effected by way of a circumferential, i.e. a rotational movement of a piston valve by means of a select arm 12 that is connected to a select lever installed near the driver's seat. Journalled on pivot 17 is a brake pedal 16 which is connected to inching shaft 19 through a pin 18. When pedal 16 is pressed downward, the inching shaft 19 moves to the left, as shown by the directional arrow, pipe 11 and pipe 13, (or pipe 14) are disconnected in the first stage of the leftward stroke of inching shaft 19, and at the same time, pipe 13, (or pipe 14) is connected to drain pipe 15. Pipe 20 transmits the fluid at regulated pressure to torque converter 3.

Figure 2:
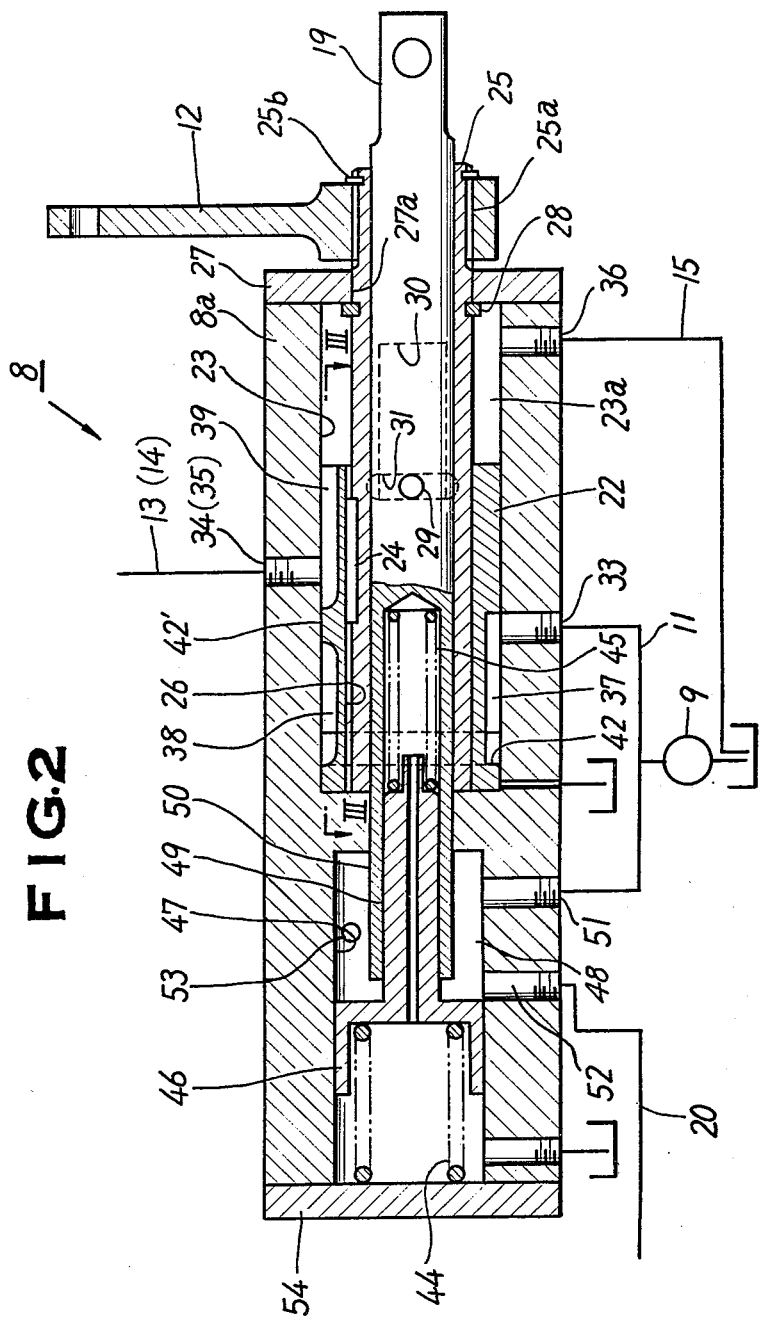
FIG. 2 is a longitudinal section view of the mechanism of the improved inching valve.
Figure 4:
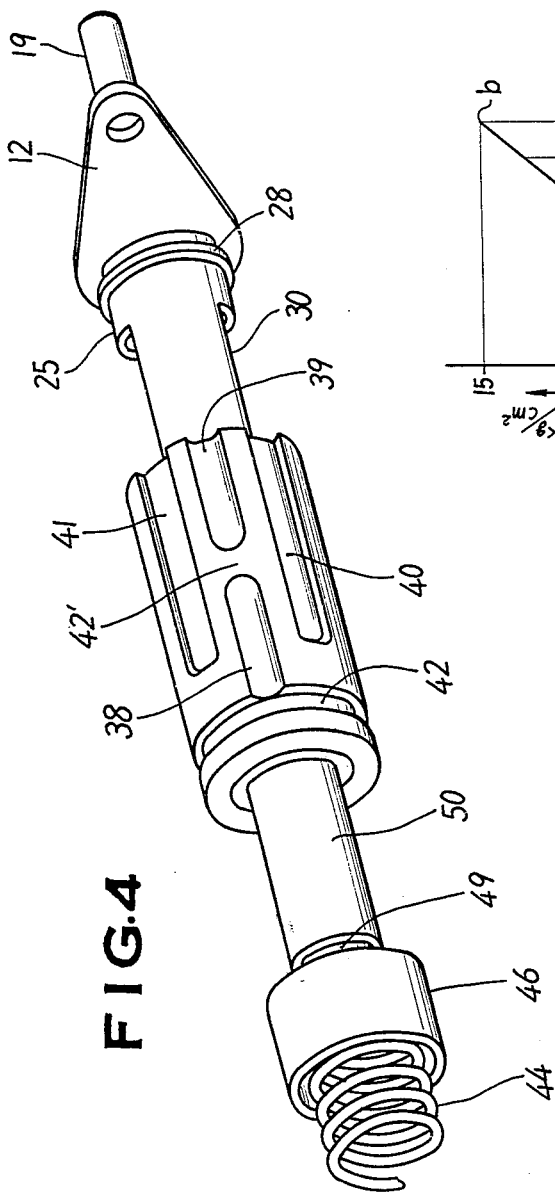
FIG. 4 is a perspective view of elements assembled inside the inching valve.

In FIG. 2, piston valve 22 functions as a select valve as well as an inching valve. Piston valve 22 comprises a hollow cylindrical tube the outer surface of which provides a snug slidable fit on a cylindrical inner surface 23 formed within the valve body to permit both axial and rotary movement in fluid-tight relation. Piston valve 22 is also journalled on select shaft 25 and only their relative rotary movement is stopped by key 24. Numeral 26 indicates a keyway formed on the inside surface of piston valve 22. Select shaft 25 holds inching shaft 19 on its inner surface and is journalled in a hole 27a of cover 27 which is attached to the rightmost end of valve body 8a. Select arm 12 is secured on spline 25a and any accidental slip-off is prevented by a retainer in the form of a snap ring 25b. Snap ring 28 prevents the select shaft 25 from any accidental slip to the right. Transversely secured on the inching shaft 19 is an inching pin 29 which projects laterally from both sides of shaft 19, and each projected part of pin 29 passes through a "window" port 30 formed on tubular select shaft 25 and engages in a circumferential slot 31 formed at the rightmost end part of piston valve 22. Thus, axial movement of inching shaft 19, caused by brake operation, is transmitted to piston valve 22 through inching pin 29 and slot 31. On the other hand, when select shaft 25 is rotated by the select lever by way of select arm 12, piston valve 22 is driven by key 24 in the same direction through the same angle, during which movement, window port 30 and slot 31 formed on shaft 25 and piston valve 22, respectively rotate together without imparting any rotational force to inching pin 29, leaving the pin 29 at standstill.

Figure 3:
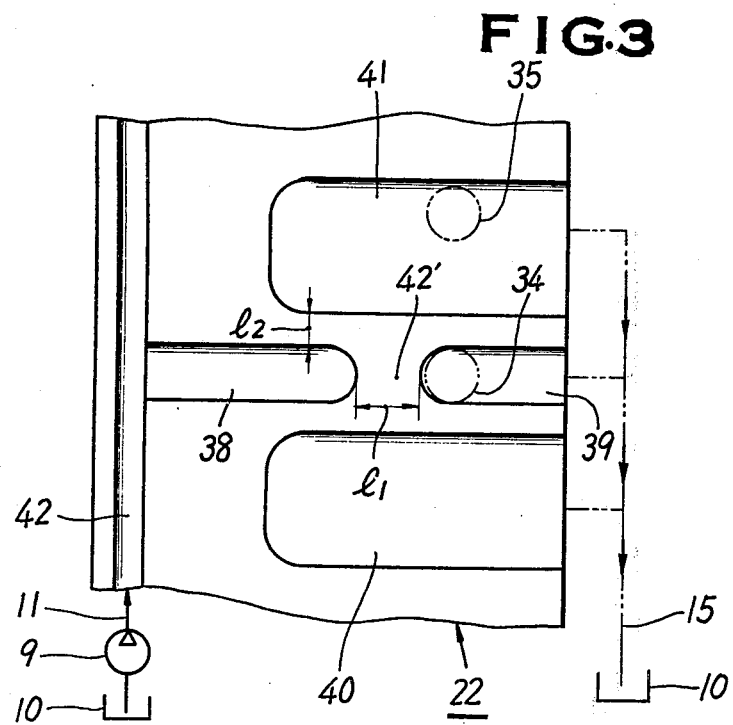
FIG. 3 is a developed view of the piston valve taken along line III—III in FIG. 2.

Opening to the cylindrical surface 23 of the valve body are inlet port 33 connected to pump 9, outlet ports 34, 35 (FIG. 3) connected to forward and rearward clutch pipes 13, 14 respectively, and drain port 36 connected to drain pipe 15. On the other hand, piston valve 22 is provided with axially extending grooves 37 (FIG. 2), 38, 39, 40 and 41 (FIG. 3), and an annular groove 42 which connects grooves 37, 38. The axial groove 37 has enough length and circumferential width, to maintain open connection with port 33 to receive the pressurized working fluid, oil, whenever piston valve 22 rotates and shifts in its full stroke. Grooves 38, 39 are axially aligned and a land 42' with a length of $l_1$ is disposed therebetween. Drain grooves 40, 41 are spaced circumferentially apart from groove 38 by distance $l_2$ (FIG. 3) and their circumferential width are determined in the manner that, in the forward position as shown in FIG. 3, in which groove 38 and port 34 are disposed on an axially common line, port 35 for rearward clutching, is fully connected to drain groove 41. On the other hand, in the rearward position, in which groove 38 and port 35 align axially, port 34 for forward clutching is fully connected to another drain groove 40.

In FIG. 2, inching valve 8 is in a condition that arm 12 is set in the forward position, and inching shaft 19 is shifted to the leftmost end of its stroke caused by the brake pedal which is pressed downward to its full stroke end. Under these circumstances, pressurized fluid from pump 9 reaches to groove 38 through pipe 11, port 33 and grooves 37, 42, the pressure of the fluid being regulated at regulating chamber 48 by a relief pressure spring 44 and relief piston 46 as more fully explained later in detail. In the meantime, port 34 for the forward clutch is connected to drain pipe 15 through groove 39, a chamber 23a inside cylinder 23 and port 36, thus keeping the forward clutch in a released state.

As the brake pedal is released from its downward position and inching shaft 19 moves to the right, piston valve 22 is driven in the same direction by pin 29, land 42' passes on the port 34 to the right, and finally groove 38 and port 34 begin to interconnect and a regulated fluid pressure in relation to the brake pedal position is supplied to the forward clutch. As the brake pedal reaches to its upper, ineffective position, port 34 fully opens to groove 38 and, at the same time, fluid pressure continues to increase and the clutch is smoothly engaged when the brake is fully released.

To regulate fluid pressure in relation to the position of the brake pedal, in the illustrated embodiment, a relief pressure spring 44 and inching spring 45 are utilized. Relief piston 46 engages in a cylinder 47 formed in the valve body in a fluid-tight relation, thus forming a pressure regulating chamber 48. Plunger 49 which is unitary with piston 46 fits inside pipe portion 50 formed in inching shaft 19 and inching spring 45 is pressed between plunger 49 and shaft 19. Inlet port 51 to chamber 48 connects this chamber with inlet port 33 through pipe 11. Numeral 52 designates an outlet port, a stopper pin for piston 46 is shown at 53 and an end cover for the valve body is shown at 54.

FIG. 2 illustrates the positions of the operating components when the brake pedal is fully depressed, i.e. when inching shaft 9 occupies its leftmost position. When the brake pedal is released slowly, and inching shaft 19 starts to move to the right, the force exerted by compression spring 45 on piston 46 decreases and this piston starts to move to the right under the influence of spring 44 partially closing off outlet port 52 which means an increase of resistance to the oil flow sent out from pump 9 through pipe 11, port 51, chamber 48, port 52, and pipe 20 to the torque converter 3. The oil pressure within chamber 48 thus increases in accordance with the increased resistance caused by the narrowed port 52. Since ports 51, 33 are inter-connected by pipe 11, oil pressure supplied to the selected clutch increases accordingly at the same time. Thus as inching shaft moves to the right, the increase in oil pressure to the selected clutch 5, 6 increases gradually and thus firm engagement of the selected clutch and the desired "inching" is obtained.

Figure 5:
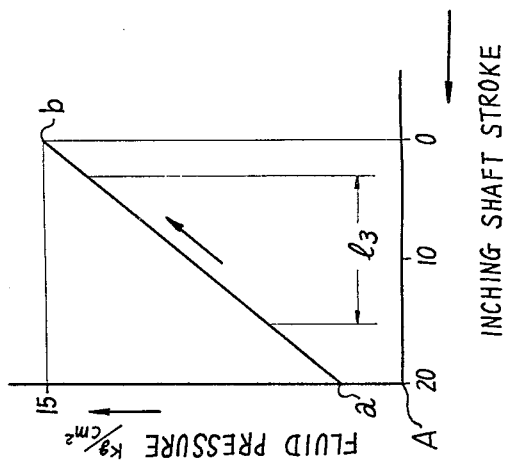
FIG. 5 is a diagram showing the relation between passageway, i.e. line pressure and inching shaft stroke.

According to the construction, the relation between the stroke of the brake pedal, i.e. the stroke of inching shaft 19 and line pressure varies as shown in FIG. 5. Point "A" in FIG. 5 corresponds to the condition as shown in FIG. 2 in which inching shaft 19 stays at its leftmost position and fluid pressure is regulated to a low value $a$ in that compressed inching spring 45 cancels the resilience of relief pressure spring 44, thus keeping the outlet port 52 open from regulating chamber 48 to line 20. From the above condition, as the brake pedal is released, and inching shaft 19 moves to the right, the strain of inching spring 45 decreases in relation to the amount of shaft displacement and fluid pressure increases along the arrow shown in FIG. 5 to the value $b$ which is given at zero stroke condition. The available pressure range $l_3$ in FIG. 5 depends, of course, on the position and length of land 42', the position of ports 34, 35 and so on.

To select the forward, or rearward, clutch, piston valve 22 is rotated by the select lever through select arm 12, and groove 38, FIG. 3, formed on piston valve 22, which groove 38 is connected to the pressurized fluid source, is axially aligned to port 34 for forward drive, or to port 35 for rearward drive. When the brake pedal is pushed downward, the clutch in operation is released before the braking is effected in that piston valve 22 slides to the left, thus shutting off groove 38 from port 34 (or port 35) and connecting port 34 (or 35) with drain port 36. Inching is effected by regulating the on-off speed between groove 38 and ports 34, 35, and regulating the fluid pressure in relation to the position of the brake pedal.

According to the present invention, since a sliding surface between piston valve 22 and cylinder 23 is effectively utilized, and forward-rearward selection is effected, for example, by the rotational movement of the piston valve, and inching is effected, for example, by the axial movement of the piston valve, a single valve (inching valve 22) functions as two valves. Therefore the construction is very simple. The cost decreases. Moreover, both functions are completely independent of each other thus assuring safe and stable operation. Also, since pressure regulation means, such as relief piston 46 is installed only at one end of the valve body it is easy to make the valve structure compact.

I claim:

1. A combined forward, rearward and inching valve structure for controlling a motorized vehicle provided with braking means comprising a cylinder, a cylindrical piston valve member located within said cylinder and which is capable of both an axial sliding movement and also a rotational movement about the cylinder axis between two limit positions, said cylinder being provided with circumferentially spaced first and second outlet ports leading respectively to forward and rearward fluid pressurized clutch means to effect forward or rearward movement of the vehicle, a hollow forward-rearward select shaft rotatably mounted in said cylinder and on which said piston valve is mounted for rotation between said limit positions, an inching shaft mounted for axial sliding movement within said hollow select shaft, means coupling said inching shaft with said piston valve member for effecting axial movement of said valve member upon axial movement of said inching shaft, means coupling said inching shaft to the brake operating means of said vehicle, a pressurized fluid source, conduit means connecting said pressurized fluid source to an inlet port on said cylinder leading to fluid distributing passages provided on said piston valve by which the pressurized fluid is led to a selected one of said outlet ports upon axial movement of said piston valve in response to movement of said inching shaft in the brake releasing direction, a piston controlled fluid pressure regulating chamber provided within said cylinder, conduit means interconnecting said pressure regulating chamber with the conduit means leading to said inlet port, and means controlling movement of the piston in said fluid pressure regulating chamber in accordance with movement of said inching shaft in the brake releasing direction to effect a progressive increase in fluid pressure in said pressure regulating chamber thereby to effect a progressive increase in pressure of the fluid being conducted to the selected clutch means which results in inching movement of the vehicle.

2. A valve structure as defined in claim 1 wherein said means for controlling the movement of said piston in said fluid pressure regulating chamber in accordance with the movement of said inching shaft comprises an inching compression spring seated in a longitudinally extending recess provided in said inching shaft, said piston includes a plunger component slidable within said recess and engageable with one end of said compression spring, and a counteracting compression spring engaged with said piston for effecting a following movement of said piston in the direction to decrease the volume in said pressure regulating chamber as said inching shaft is moved in the brake releasing direction.

* * * * *